(12) United States Patent
Boies et al.

(10) Patent No.: US 11,931,809 B2
(45) Date of Patent: Mar. 19, 2024

(54) APPARATUS FOR THE PRODUCTION OF NANOPARTICLES AND METHOD FOR PRODUCING NANOPARTICLES

(71) Applicant: Catalytic Instruments Gmbh & Co. KG, Rosenheim (DE)

(72) Inventors: Adam Meyer Boies, Cambridge (GB); Jacob John Swanson, Richfield, MN (US); Hans-Joachim Schulz, Rosenheim (DE)

(73) Assignee: Catalytic Instruments GmbH & Co. KG, Rosenheim (DE)

( * ) Notice: Subject to any disclaimer, the term of this patent is extended or adjusted under 35 U.S.C. 154(b) by 741 days.

(21) Appl. No.: 16/828,373

(22) Filed: Mar. 24, 2020

(65) Prior Publication Data
US 2020/0306833 A1    Oct. 1, 2020

(30) Foreign Application Priority Data
Mar. 28, 2019   (EP) .................................... 19165884

(51) Int. Cl.
*B22F 9/08*   (2006.01)
*B01J 2/04*   (2006.01)
(Continued)

(52) U.S. Cl.
CPC .................................... *B22F 9/12* (2013.01); *B01J 2/04* (2013.01); *B01L 3/00* (2013.01); *B01L 3/5025* (2013.01); *B01L 3/5027* (2013.01); *B22F 1/054* (2022.01); *B22F 1/056* (2022.01); *B22F 9/082* (2013.01); *B22F 2009/0832* (2013.01);
(Continued)

(58) Field of Classification Search
CPC .. B22F 1/054; B22F 1/056; B22F 9/12; B22F 2009/0832; B22F 9/082; B01L 3/00; B01L 3/5025; B01L 3/5027; B01J 2/04
USPC ............. 266/202, 216, 233; 75/338; 264/12; 425/6
See application file for complete search history.

(56) References Cited

U.S. PATENT DOCUMENTS 3,510,546 A * 5/1970 Wentzell ................... B22F 9/08
75/340
4,040,815 A    8/1977 Francois
(Continued)

OTHER PUBLICATIONS

Flagan, R. and Lunden, M., "Particle structure control in nanoparticle synthesis from the vapor phase," Materials Science and Engineering A204, pp. 113-124, 1995.
(Continued)

*Primary Examiner* — Jessee R Roe
*Assistant Examiner* — Michael Aboagye
(74) *Attorney, Agent, or Firm* — Nixon Peabody LLP (57) ABSTRACT

An apparatus for the production of nanoparticles is provided. The apparatus includes a main tube that is closed at a bottom, an inlet channel arranged within the main tube and includes a first opening to the outside of the apparatus and a second opening to the main tube, and a main opening in the main tube. The main tube includes a sample position at the bottom, the cross section of the main tube at the sample position is smaller than at other positions of the main tube, and the second opening of the inlet channel is arranged closer to the sample position than the main opening. Furthermore, an arrangement for the production of nanoparticles and a method for producing nanoparticles are provided.

17 Claims, 3 Drawing Sheets

(51) Int. Cl.
*B01L 3/00* (2006.01)
*B22F 1/054* (2022.01)
*B22F 9/12* (2006.01)
*B82Y 40/00* (2011.01)

(52) U.S. Cl.
CPC . *B22F 2009/0896* (2013.01); *B22F 2301/255* (2013.01); *B82Y 40/00* (2013.01)

(56) References Cited

U.S. PATENT DOCUMENTS

| | | | |
|---|---|---|---|
| 4,610,719 A | | 9/1986 | Wentzell |
| 4,626,278 A | * | 12/1986 | Kenney .................. B22F 9/082 75/355 |
| 4,675,171 A | * | 6/1987 | Kubo ...................... B01J 12/02 423/617 |
| 4,675,172 A | | 6/1987 | Quan |
| 4,808,218 A | | 2/1989 | Wagner |
| 4,810,288 A | | 3/1989 | Baszczuk |
| 2008/0107587 A1 | * | 5/2008 | Yumura .................. B82Y 30/00 423/447.3 |
| 2017/0297113 A1 | | 10/2017 | Faucher et al. |

OTHER PUBLICATIONS

Fougere, G.E. et al., "Young's modulus of nanocrystalline Fe measured by nanoindentation," Materials Science and Engineering A204, pp. 1-6, 1995.

Eastman, J. and Choi, S., "Enhancing thermal conductivity of fluids with nanoparticles," Energy Technology Division and Materials Science Division, Argonne National Laboratory, pp. 1-9, Oct. 1995.
Hahn, H., "Gas phase synthesis of nanocrystalline materials," Nanostructured Materials, vol. 9, Issues 1-8, 1997. (Abstract only).
Kruis, F.E. et al., "Synthesis of nanoparticles in the gas phase for electronic, optical and magnetic applications—a review," Journal of Aerosol Science, vol. 29, Issues 5-6, pp. 511-535, Jul. 1998.
Swihart, M., "Vapor-phase synthesis of nanoparticles," Current Opinion in Colloid & Interface Science, vol. 8, Issue 1, pp. 127-123, Mar. 2003.
Baker, C. et al., "Synthesis and Antibacterial Properties of Silver Nanopartieles," Journal of Nanoseienee and Nanotechnology, vol. 5, No. 2, pp. 244-249, Feb. 2005.
Peineke, C. et al., "Using a glowing wire generator for production of charged, uniformly sized nanoparticles at high concentrations," Aerosol Science vol. 37, pp. 1651-1661, 2006.
Raffi, M. et al., "Studies of the growth parameters for silver nanoparticle synthesis by inert gas condensation," Journal of Materials Research, vol. 22, Issue 12, pp. 3378-3384, Dec. 2007.
Raffi, M. et al., "Antibacterial Characterization of Silver Nanoparticles against *E. coli* ATCC-15224," J. Mater. Sci. Technol., vol. 24, No. 24, pp. 192-196, 2008.
Perez-Tijerina, E. et al., "Highly size-controlled synthesis of Au/Pd nanoparticles by inert-gas condensation," Faraday Discussions, vol. 138, pp. 1-10, 2008.
Gracia-Pinilla, M. et al., "Deposition of Size-Selected Cu Nanoparticles by Inert Gas Condensation," Nanoscale Research Letters, 5:180, Nov. 6, 2009.

* cited by examiner

APPARATUS FOR THE PRODUCTION OF NANOPARTICLES AND METHOD FOR PRODUCING NANOPARTICLES

CROSS-REFERENCE TO RELATED APPLICATIONS

This application claims the benefit of European Patent Application Serial No. 19165884.8, filed Mar. 28, 2019, which is incorporated herein by reference in its entirety.

FIELD OF THE INVENTION

The present invention relates to an apparatus for the production of nanoparticles, to an arrangement for the production of nanoparticles and to a method for producing nanoparticles.

BACKGROUND OF THE INVENTION

In order to produce nanoparticles a precursor material for the nanoparticles can be placed in a tube furnace. Subsequently, the precursor material, for example a metal, can be evaporated. However, the evaporation results in varying sizes and numbers of nanoparticles. The rate of evaporation of the respective precursor material depends exponentially on the temperature of the precursor material. Since the temperature can slightly vary within the tube furnace the size and number of the nanoparticles produced are in many cases not reproducible or have a great variance.

The patent application US 20170297113 A1 describes a process for forming particles. A metal is evaporated or sublimated in a furnace and solidified in a stream of gas.

It is an objective to provide an apparatus for the production of nanoparticles that enables the production of nanoparticles with an increased reliability. It is further an objective to provide a method for producing nanoparticles with an increased reliability.

These objectives are achieved with the independent claims. Further embodiments are the subject of dependent claims.

SUMMARY OF THE INVENTION

In at least one embodiment of the apparatus for the production of nanoparticles, the apparatus comprises a main tube, that is closed at a bottom. This means, the main tube can be a test tube. The main tube can have the shape of a cylinder that is closed at one side, namely at the bottom. At the side of the main tube facing away from the bottom the main tube can be connected with other components of the apparatus. For example, the main tube is at least partially mounted within a holder of the apparatus. Preferably, the main tube can be reversibly removed from the holder. It is further possible, that the main tube is arranged at a variable distance with respect to the holder. This means, the distance between the holder and the sample position can be varied. When the apparatus is operated, the main tube can be arranged in such a way that its main axis of extension is substantially parallel, in particular parallel, to the gravitational force. It is further possible, that the main axis of extension of the main tube encloses an angle of at least 0° and at most 45° with the direction of the gravitational force.

In at least one embodiment of the apparatus for the production of nanoparticles, the apparatus comprises an inlet channel which is arranged within the main tube and comprises a first opening to the outside of the apparatus and a second opening to the main tube. That the inlet channel is arranged within the main tube can mean that the inlet channel is a separated region within the main tube. The second opening of the inlet channel can be the only connection of the inlet channel to the main tube. This means, a volume of gas arranged within the inlet channel only is in contact with gas within the other regions of the main tube via the second opening of the inlet channel. Via the first opening of the inlet channel a volume of gas arranged within the inlet channel is in contact with the surroundings of the apparatus. The inlet channel can directly adjoin the outside of the apparatus. Alternatively, the inlet channel is connected with the outside of the apparatus via another channel or tube. The inlet channel can have a main axis of extension which is parallel to the main axis of extension of the main tube. The inlet channel can be shorter along the main axis of extension of the main tube than the main tube. This can mean, that the second opening of the inlet channel is arranged spaced apart from the bottom of the main tube. In other words, the second opening of the inlet channel is not in direct contact with the bottom of the main tube.

In at least one embodiment of the apparatus for the production of nanoparticles, the apparatus comprises a main opening in the main tube. The main opening can be the only opening in the main tube. The main opening can be arranged at a top of the main tube. This means, the main opening can be arranged at a side of the main tube that is opposite to the bottom of the main tube. For example, the main opening is connected with other parts of the apparatus, for example with another tube or the holder. The size of the main opening can be large enough so that it is permeable for gases in which nanoparticles are mixed.

In at least one embodiment of the apparatus for the production of nanoparticles, the main tube comprises a sample position at the bottom. The sample position can be configured for placing a precursor material to be evaporated at the sample position. The sample position can be the lowest point within the main tube. This means, the main tube can be configured in such a way that it comprises exactly one lowest point. In this case, the sample position is arranged at this lowest point. The main tube can have a curved shape at its bottom. The sample position can be arranged within the curved portion of the main tube. This means, the sample position is a specific position within the main tube. The precursor material comprises for example a metal, such as silver, an organic material, such as tetracontane, or a chalcogen, such as sulfur.

In at least one embodiment of the apparatus for the production of nanoparticles, the cross section of the main tube at the sample position is smaller than at other positions of the main tube. The cross section of the main tube can be given within a plane that extends perpendicular to the main axis of extension of the main tube. The cross section of the main tube can be given at any position of the main tube. The cross section of the main tube can be an area that gives the size of the main tube at the position of the cross section. In the case that the main tube has the shape of a cylinder, the cross section of the main tube has the shape of a circle. That the cross section of the main tube at the sample position is smaller than at other positions of the main tube, can mean that the main tube narrows towards the sample position. In the region of the sample position the cross section of the main tube is smaller than at other positions of the main tube. If the main tube has the shape of a cylinder, the diameter of the main tube at the sample position is smaller than at other positions of the main tube. The main tube can have a curved or rounded shape at its bottom. It is further possible, that the bottom of the main tube is flat and that the cross section of the main tube is smaller close to the bottom than at other positions of the main tube. In this way it can be achieved that the cross section of the main tube at the sample position is smaller than at other positions of the main tube.

In at least one embodiment of the apparatus for the production of nanoparticles, the second opening of the inlet channel is arranged closer to the sample position than the main opening. This means, the main opening is arranged further away from the sample position than the second opening of the inlet channel.

In at least one embodiment of the apparatus for the production of nanoparticles, the apparatus comprises a main tube, that is closed at a bottom, an inlet channel which is arranged within the main tube and comprises a first opening to the outside of the apparatus and a second opening to the main tube, and a main opening in the main tube, wherein the main tube comprises a sample position at the bottom, the cross section of the main tube at the sample position is smaller than at other positions of the main tube, and the second opening of the inlet channel is arranged closer to the sample position than the main opening.

For the production of nanoparticles a precursor material to be evaporated can be placed at the sample position. Since the cross section of the main tube at the sample position is smaller than at other positions of the main tube, the precursor material to be evaporated is confined at the sample position. As a first step, the precursor material can be melted. Afterwards, the precursor material will be located exactly at the sample position because of the gravitational force. The sample position is a well-defined position because it is relatively small in comparison to the cross section of the main tube at other positions than the sample position. This means, for following evaporations of the precursor material, the precursor material will always be located at the same position. If the same heat is applied to this position in each case, the evaporation rate of the precursor material will be reproducible. This means, the confinement of the precursor material at the sample position enables a reproducible and thus reliable rate of evaporation of the precursor material and thus a reproducible number of nanoparticles. As the precursor material to be evaporated is confined at a relatively small spot within the main tube, temperature differences within the main tube during operation have a reduced influence on the evaporation rate of the precursor material. Therefore, the reliability of the formation of nanoparticles is increased.

The nanoparticles produced in the apparatus can have a size between 0.5 and 500 nm.

In addition, the apparatus is suitable for the production of an aerosol containing the nanoparticles, this means the nanoparticles are suspended in the gas phase. For this purpose, a primary gas can be led into the main tube via the inlet channel. Since the second opening of the inlet channel is arranged closer to the sample position than the main opening, the primary gas firstly gets in contact with the evaporated precursor material so that the nanoparticles can condense within the primary gas. Due to the well-defined sample position at the bottom of the main tube the geometry is fixed also in this case, so that the primary gas interacts with the precursor material in the same way in each case. Afterwards the primary gas with the nanoparticles is led out of the main tube via the main opening. Therefore, the geometry of the main tube, the inlet channel and the main opening determines the flow of the primary gas. This leads to a reproducible and to a homogenous production of the aerosol. The concentration of the nanoparticles in the aerosol is for example at least $10^2$ nanoparticles/cm$^3$ and at most $10^8$ nanoparticles/cm$^3$. This setup further allows a long operation time of the apparatus, for example longer than 10 hours.

The primary gas that is led into the main tube can have a temperature that is lower than the temperature of the evaporated precursor material. Consequently, the evaporated precursor material can condense and solidify within the primary gas. Thus, a condensation of the evaporated precursor material at inner walls of the main tube and other parts of the apparatus is reduced.

Moreover, the apparatus enables the production of nanoparticles of different sizes and in different concentrations. For this purpose, the distance between the sample position and the holder, the heat applied to the main tube as well as the amount of primary gas led into the inlet channel per time are adjustable.

Overall, the apparatus can have a compact setup. Consequently, the apparatus is easy to produce and to handle.

The apparatus for the production of nanoparticles can be employed for a calibration of aerosol measurement equipment. The nanoparticles produced by the apparatus can be fractal-like aggregates or have a fractal-like shape. The shape of the nanoparticles produced can be similar to the shape of soot particles. Therefore, the apparatus can advantageously be employed for a calibration of aerosol measurement equipment that is used for automotive soot measurement.

The apparatus is in particular designed for the production of metal nanoparticles. This means, the precursor material comprises a metal in this case, as well as the nanoparticles.

In at least one embodiment of the apparatus for the production of nanoparticles, the inlet channel is formed by an inlet tube that is arranged within the main tube and extends further outside of the main tube. This can mean, that the inlet channel is in places arranged within the inlet tube. The inlet tube can have a first opening to the outside of the apparatus and a second opening to the main tube. These can be the only openings of the inlet tube. That the inlet tube is arranged within the main tube and extends further outside of the main tube, can mean that a part of the inlet tube is arranged within the main tube and another part of the inlet tube is arranged outside of the main tube. The apparatus can comprise a holder within which the inlet tube is arranged. The inlet tube can extend further outside of the holder. The main tube can be connected to the holder. As an example, the inlet tube comprises quartz glass or a ceramic material. The holder for example comprises a metal, a plastic material, polytetrafluoroethylene, stainless steel or Teflon. Through the inlet tube a primary gas can be led into the main tube.

In at least one embodiment of the apparatus for the production of nanoparticles, the main tube has a circular cross section and the inlet tube is arranged at the center of the cross section at least in places. This can mean, that the inlet tube is arranged within the main tube at some positions. The inlet tube does not necessarily extend until the bottom of the main tube. The cross section of the inlet tube can be smaller than the cross section of the main tube. This means, the inlet tube is arranged in the middle of the main tube such that it is surrounded by a remaining concentric volume within the main tube. In this way, a primary gas can be led in the direction of the sample position through the inlet tube and the primary gas with the nanoparticles is led in the direction of the main opening through the remaining concentric volume of the main tube. Thus, a controlled and reproducible flow of the primary gas within the main tube can be achieved. Furthermore, the primary gas can be led through the inlet channel in the direction of the center of the sample position. Therefore, the interaction of the primary gas with the evaporated precursor material is increased.

In at least one embodiment of the apparatus for the production of nanoparticles, an outlet channel extends parallel to the inlet channel within the main tube and the outlet channel is connected with the main opening. The outlet channel can be formed by a part of the main tube which is free of the inlet channel. This means, the outlet channel can be arranged in a remaining volume of the main tube in which the inlet channel is not arranged. The outlet channel can have the same length as the inlet channel along the main axis of extension of the main tube. The main axis of extension of the outlet channel is parallel to the main axis of extension of the inlet channel. At the side of the outlet channel that faces away from the sample position the main opening can be arranged. This arrangement of the inlet channel and the outlet channel enables a homogenous and reproducible flow of the primary gas through the main tube. In this way, nanoparticles can be formed in a reliable manner.

In at least one embodiment of the apparatus for the production of nanoparticles, the main tube comprises a material that has a melting point of at least 1000° C. Preferably, the main tube comprises a material that has a melting point of at least 1300° C. For example the main tube comprises a ceramic material or quartz glass. The main tube comprises a material with a melting point that is higher than the melting point of precursor material to be evaporated. Consequently, the precursor material can be evaporated within the main tube without destroying or melting the main tube.

In at least one embodiment of the apparatus for the production of nanoparticles, a heating device is arranged around the main tube at least in the region of the sample position. The heating device can be arranged in such a way that it can heat the main tube at least in the region of the sample position in order to melt a precursor material arranged at the sample position. This means, the heating device is in thermal contact with the main tube at least in the region of the sample position. For example, the heating device is configured to be heated up to a temperature of 2000° C. The heating device can be a heating wire which is wound around the main tube at least in the region of the sample position. The heating wire can comprise an electrically conductive material. The heating wire can be in direct contact with the main tube. Consequently, the heating device is employed in order to melt the precursor material arranged at the sample position.

Instead of a heating device which is arranged around the main tube an external heating device that is not an integral part of the apparatus can be employed in order to melt the precursor material arranged at the sample position.

In at least one embodiment of the apparatus for the production of nanoparticles, an outlet tube is connected to the main opening and the outlet tube comprises a first opening and a second opening to the outside of the apparatus, wherein the connection of the outlet tube to the main tube is arranged between the first opening and the second opening of the outlet tube. The outlet tube can be directly connected to the main opening of the main tube or via another tube or a part of the holder. The first opening, the second opening and the connection to the main opening can be the only openings of the outlet tube. The main axis of extension of the outlet tube can enclose an angle of larger than 0° with the main axis of extension of the main tube. For example, the main axis of extension of the outlet tube encloses an angle of 90° with the main axis of extension of the main tube. The outlet tube can have the shape of a cylinder. That the connection of the outlet tube to the main tube is arranged between the first opening and the second opening of the outlet tube can mean that a dilution gas led into the outlet tube through the first opening of the outlet tube firstly passes the connection to the main opening and then the second opening of the outlet tube. This means, an aerosol formed in the main tube is led into the outlet tube through the main opening. In the outlet tube the aerosol can mix with the dilution gas such that a desired dilution of the aerosol is achieved within the outlet tube.

In at least one embodiment of the apparatus for the production of nanoparticles, the cross section of the outlet tube is larger than the cross section of the inlet channel. If the output tube has the shape of a cylinder, the diameter of the outlet tube is larger than the diameter of the inlet channel. If the inlet channel is formed by the inlet tube, the cross section of the outlet tube is larger than the cross section of the inlet tube. In this way, a desired dilution of the aerosol can be achieved in the outlet tube if a dilution gas is provided in the outlet tube.

The diameter of the inlet channel or the inlet tube can be at least 0.5 mm and at most 1 m. Preferably, the diameter of the inlet channel or the inlet tube is at least 0.5 mm and at most 3 cm. The diameter of the outlet tube can be at least 0.5 mm and at most 1 m. Preferably, the diameter of the outlet tube is at least 0.5 mm and at most 3 cm.

Furthermore, an arrangement for the production of nanoparticles is provided. In at least one embodiment of the arrangement for the production of nanoparticles, the arrangement comprises the apparatus for the production of nanoparticles and a mass flow controller that is connected to the inlet channel. All features disclosed for the apparatus are also disclosed for the arrangement and vice versa. The mass flow controller can be configured to control the amount and the velocity of the primary gas led into the inlet channel. As an example, the mass flow controller can provide a flow of primary gas between 0.1 and 500 standard liters per minute. If the inlet channel is formed by the inlet tube, the mass flow controller can be connected with the inlet tube.

The arrangement is in particular an arrangement for the production of metal nanoparticles.

In at least one embodiment of the arrangement for the production of nanoparticles, a particle filter is connected to the second opening of the outlet tube. The particle filter can be connected in parallel to the second opening of the outlet tube. The second opening of the outlet tube can be connected with an outlet of the arrangement. At the outlet of the arrangement the aerosol comprising the nanoparticles can be provided. For the case that the outlet of the arrangement is connected to an external device that only accepts a limited amount of the aerosol for per time, the particle filter is connected to the second opening of the outlet tube as well. This means, the particle filter and the outlet are connected in parallel to the second opening of the outlet tube. A part of the aerosol provided at the second opening of the outlet tube is led to the particle filter. The particle filter is configured to filter the nanoparticles out of the aerosol. This means, the particle filter is configured to provide a gas at its output that is free or mostly free of the nanoparticles. If the gases used in the arrangement are not harmful to humans it is advantageously possible to lead the gas provided at the output of the particle filter into the surrounding air. By configuring the proportion of the aerosol provided at the second opening of the outlet tube that is provided at the outlet of the arrangement, the amount of aerosol provided at the outlet of the arrangement can be adapted to requirements of external devices connected to the arrangement. Therefore, the arrangement can advantageously be employed with a great variety of devices.

In at least one embodiment of the arrangement for the production of nanoparticles, a differential mobility analyzer is connected to the second opening of the outlet tube. The differential mobility analyzer can be configured to select a specific mobility diameter of nanoparticles. The differential mobility analyzer can comprise an output. The differential ability analyzer can further be configured to provide nanoparticles of the same mobility diameter or of a range of mobility diameters at its output. For this purpose a charging element is arranged between the second opening of the outlet tube and the differential mobility analyzer. The charging element is configured to charge the nanoparticles that are comprised by the aerosol provided at the second opening of the outlet tube. Preferably, the charging element is configured to charge the nanoparticles in such a way that the amount of positively charged nanoparticles is substantially the same as the amount of negatively charged nanoparticles. Subsequently, the differential mobility analyzer is configured to sort the charged nanoparticles in dependence of their drag to charge ratio. In this way, nanoparticles of the same mobility diameter or of a range of similar mobility diameters can be sorted out of the aerosol. Consequently, the arrangement enables the production of monodisperse nanoparticles.

In at least one embodiment of the arrangement for the production of nanoparticles, a furnace is connected to the second opening of the outlet tube. The furnace can be a sintering furnace. The furnace can be configured to heat a gas supplied to the furnace to a desired temperature. In this way, the furnace can be employed to heat the nanoparticles in the aerosol provided at the second opening of the outlet tube. By heating the nanoparticles in the furnace, nanoparticles with a uniform shape can be formed. For example, the nanoparticles can be formed to have approximately the shape of a sphere in the furnace.

Furthermore, a method for producing nanoparticles is provided. The apparatus and the arrangement can preferably be employed in the methods described herein. This means all features disclosed for the apparatus and for the arrangement are also disclosed for the method for producing nanoparticles and vice-versa.

According to at least one embodiment of the method for producing nanoparticles, the method comprises the step of providing a main tube that is closed at a bottom of the main tube and that comprises a sample position at the bottom.

According to at least one embodiment of the method for producing nanoparticles, the method comprises the step of providing a main opening in the main tube.

According to at least one embodiment of the method for producing nanoparticles, the method comprises the step of positioning a precursor material at the sample position. The precursor material comprises for example a metal, such as silver, an organic material, such as tetracontane, or a chalcogen, such as sulfur. It is further possible that the precursor material is comprised by a compound which is positioned at the sample position. Preferably, if the precursor material comprises a metal, the metal has a vapor pressure of greater than $5*10^{-3}$ Pa. The metal can be provided as a powder, as a wire or in any other shape.

According to at least one embodiment of the method for producing nanoparticles, the method comprises the step of evaporating the precursor material by heating the precursor material by a heating device that is in thermal contact with the main tube. The heating device is for example a wire that is in direct contact with the main tube. It is further possible that the heating device is any other heating device in thermal contact with the main tube. As the heating device is in thermal contact with the main tube, the main tube is heated. The main tube is heated in the region of the sample position so that the precursor material arranged at the sample position is heated as well. In this way, the precursor material is evaporated. It is further possible that the precursor material is melted and/or sublimated.

According to at least one embodiment of the method for producing nanoparticles, the method comprises the step of providing a stream of a primary gas into the main tube through an inlet channel which is arranged within the main tube. The primary gas can be provided to the inlet channel by a mass flow controller. In this way, the velocity and the amount of the primary gas per time can be controlled. The primary gas can be any suitable gas, for example air or an inert gas.

According to at least one embodiment of the method for producing nanoparticles, the cross section of the main tube at the sample position is smaller than at other positions of the main tube.

According to at least one embodiment of the method for producing nanoparticles, the method comprises the steps of providing a main tube that is closed at a bottom of the main tube and that comprises a sample position at the bottom, providing a main opening in the main tube, positioning a precursor material at the sample position, evaporating the precursor material by heating the precursor material by a heating device that is in thermal contact with the main tube, and providing a stream of a primary gas into the main tube through an inlet channel which is arranged within the main tube, wherein the cross section of the main tube at the sample position is smaller than at other positions of the main tube.

The method is in particular a method for producing metal nanoparticles.

By employing the method for producing nanoparticles described here, nanoparticles can be produced in a reliable way. At first, the number and size of the nanoparticles formed in the main tube can be controlled by adjusting the velocity and the amount of primary gas provided to the main tube. These features of the primary gas can for example be controlled by the mass flow controller. The setup employed for producing nanoparticles allows a reproducible evaporation rate of the precursor material, since the precursor material is arranged at the well-defined sample position. As the precursor material is melted, the liquid is always arranged at the lowest point in the main tube which is the sample position.

According to at least one embodiment of the method for producing nanoparticles, the main direction of extension of the stream of primary gas encloses an angle of at least 0° and at most 45° with the direction of the gravitational force. This can be achieved by employing an inlet channel that extends parallel or substantially parallel to the direction of the gravitational force. In this way, the interaction of the primary gas with the precursor material is advantageously increased.

According to at least one embodiment of the method for producing nanoparticles, a primary dilution and/or a secondary dilution are provided to the nanoparticles. For the primary dilution, a dilution gas can be provided to the first opening of the outlet tube. The dilution gas can be provided by a further mass flow controller. Through the main opening the primary gas with the nanoparticles enters the outlet tube. Within the outlet tube the primary gas with the nanoparticles is mixed with the dilution gas. For the secondary dilution, a dilution gas can be provided at the second opening of the outlet tube. This means, the primary gas with the nanoparticles can mix with the dilution gas after passing the second opening of the outlet tube. By providing a primary and/or a secondary dilution, the concentration of the nanoparticles in the aerosol can be adjusted.

BRIEF DESCRIPTION OF THE DRAWINGS

The following description of figures may further illustrate and explain exemplary embodiments. Components that are functionally identical or have an identical effect are denoted by identical references. Identical or effectively identical components might be described only with respect to the figures where they occur first. Their description is not necessarily repeated in successive figures.

With FIG. 5 an exemplary embodiment of the method for producing nanoparticles is described.

DETAILED DESCRIPTION OF THE INVENTION

Figure 1:
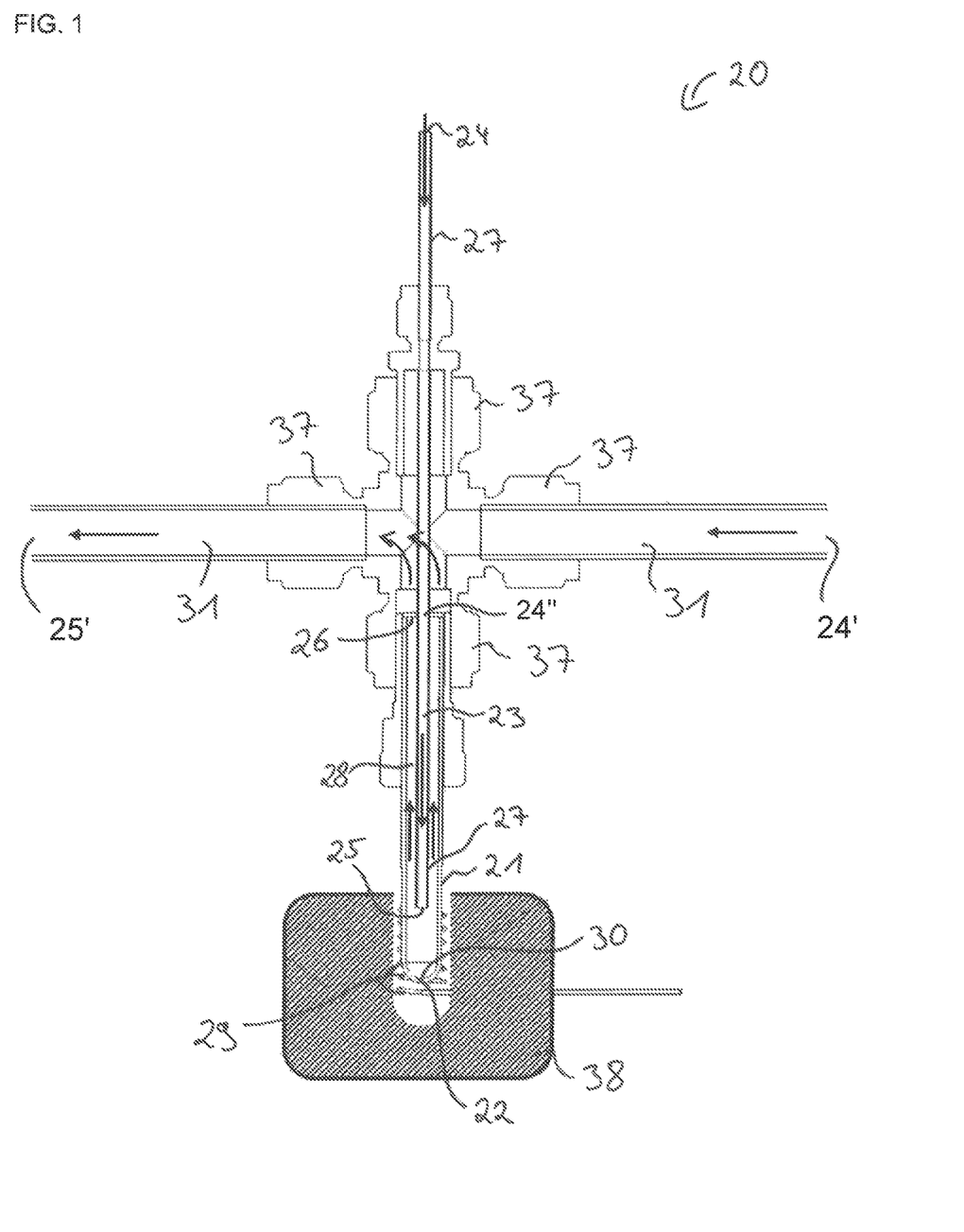
In FIG. 1 a cross section through an exemplary embodiment of the apparatus for the production of nanoparticles is shown.

In FIG. 1 a cross section through an embodiment of an apparatus 20 for the production of nanoparticles is shown. The apparatus 20 comprises a main tube 21 that is connected with a holder 37 of the apparatus 20. The main tube 21 has the shape of a cylinder and it is closed at a bottom 22. At the bottom 22 the main tube 21 has a rounded shape. The main tube 21 is made of quartz glass. A part of the main tube 21 is arranged within the holder 37. The holder 37 is a rigid structure. The holder 37 is configured to connect different parts of the apparatus 20 with each other.

The apparatus 20 further comprises an inlet tube 27. The inlet tube 27 is arranged within the main tube 21 and comprises a first opening 24" to the outside of the apparatus 20 and a second opening 25 to the main tube 21. Within the part of the inlet tube 27 that is arranged within the main tube 21 an inlet channel 23 is formed. The inlet channel 23 comprises a first opening 24 to the outside of the apparatus 20 and a second opening 25 to the main tube 21. The inlet tube 27 further extends outside of the main tube 21. The inlet tube 27 is in places arranged within the holder 37. A part of the inlet tube 27 is arranged outside of the holder 37. The inlet tube 27 has the shape of a cylinder. The first opening 24 and the second opening 25 are the only openings of the inlet tube 27. Within the main tube 21 the inlet tube 27 does not extend completely towards the bottom 22. This means, the part of the inlet tube 27 that is arranged within the main tube 21 is shorter than the main tube 21.

The main tube 21 further comprises a main opening 26. The main opening 26 is arranged at the top of the main tube 21. This means, the main opening 26 is arranged at the side of the main tube 21 that faces away from the bottom 22. The inlet tube 27 is arranged at the center of the main tube 21. This means, that the inlet tube 27 is arranged at the center of the circular cross section of the main tube 21. As the diameter of the inlet tube 27 is smaller than the diameter of the main tube 21, a volume within the main tube 21 remains around the inlet tube 27. This volume forms an outlet channel 28. This means, the outlet channel 28 extends parallel to the inlet channel 23. The outlet channel 28 is connected with the main opening 26. Via the main opening 26 the outlet channel 28 and thus the main tube 21 is connected with an outlet tube 31 of the apparatus 20. The outlet tube 31 is in places arranged within the holder 37.

The main axis of extension of the main tube 21 and the main axis of extension of the outlet tube 31 enclose an angle of 90°. The outlet tube 31 has the shape of a cylinder. The outlet tube 31 comprises a first opening 24' and a second opening 25' to the outside of the apparatus 20, respectively. Furthermore, the outlet tube 31 comprises the connection to the main opening 26. The outlet tube 31 and the main tube 21 are connected with each other via an inner volume of the holder 37. At the center of the apparatus 20 the inlet tube 27 and the outlet tube 31 cross each other. The cross section of the outlet tube 31 is larger than the cross section of the inlet channel 23 and it is also larger than the cross section of the inlet tube 27. This means, the inlet tube 27 has a smaller diameter than the outlet tube 31. Therefore, the inlet tube 27 extends through the outlet tube 31. However, the inlet tube 27 and the outlet tube 31 are not connected with each other so that a gas within inlet tube 27 cannot directly pass from the inlet tube 27 to the outlet tube 31 without passing through the main tube 21. As the diameter of the outlet tube 31 is larger than the diameter of the inlet tube 27, a gas flowing from the first opening 24' of the outlet tube 31 to the second opening 25' of the outlet tube 31 can pass around the inlet tube 27 crossing the outlet tube 31. The connection of the outlet tube 31 to the main tube 21 is arranged between the first opening 24' and the second opening 25' of the outlet tube 31.

The main tube 21 further comprises a sample position 30 at the bottom 22. The sample position 30 is arranged at the lowest point of the main tube 21. The cross section of the main tube 21 at the sample position 30 is smaller than at other positions of the main tube 21.

Due to the arrangement of the inlet tube 27, the main tube 21 and the main opening 26, the second opening 25 of the inlet channel 23 arranged within the inlet tube 27 is arranged closer to the sample position 30 than the main opening 26.

A heating device 29 is arranged around the main tube 21 in the region of the sample position 30. The heating device 29 is a heating wire that is wound around the main tube 21 in the region of the sample position 30. This means, the heating device 29 is in thermal contact with the main tube 21. Around the heating device 29 an isolation device 38 is arranged. The isolation device 38 is configured to isolate the heating device 29 against the colder surrounding of the apparatus 20 during heating.

In FIG. 1 the flow of a gas provided to the apparatus 20 is shown by arrows. A primary gas can be provided at the first opening 24 of the inlet tube 27. The primary gas can flow down towards the sample position 30. Within the main tube 21 the primary gas flows towards the main opening 26. From the main opening 26 the primary gas flows into the outlet tube 31. In the outlet tube 31 the primary gas mixes with a dilution gas that is provided to the outlet tube 31 at its first opening 24'. The primary gas and the dilution gas flow through the outlet tube 31 to its second opening 25'.

Figure 2:
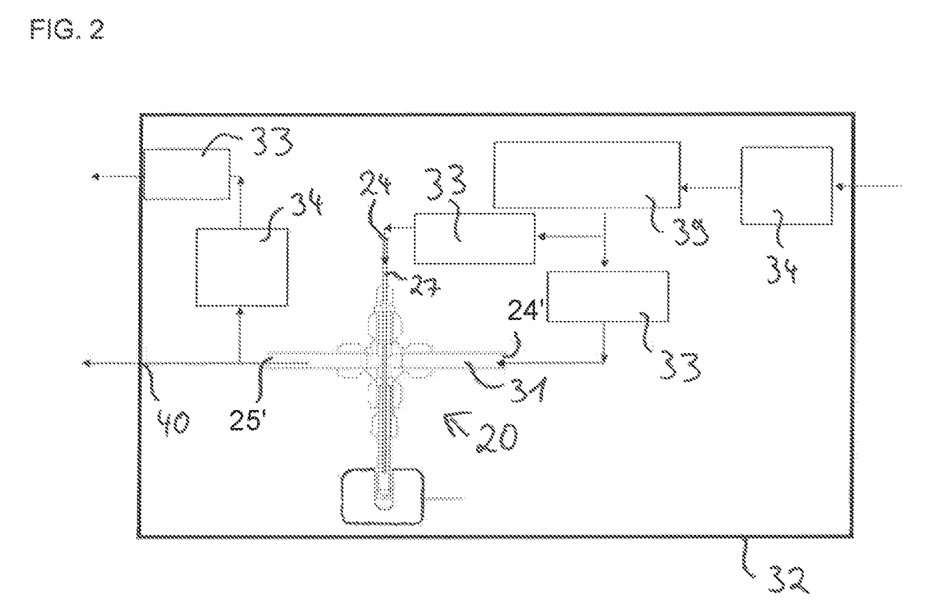
FIGS. 2, 3 and 4 show exemplary embodiments of the arrangement for the production of nanoparticles.
Figure 3:
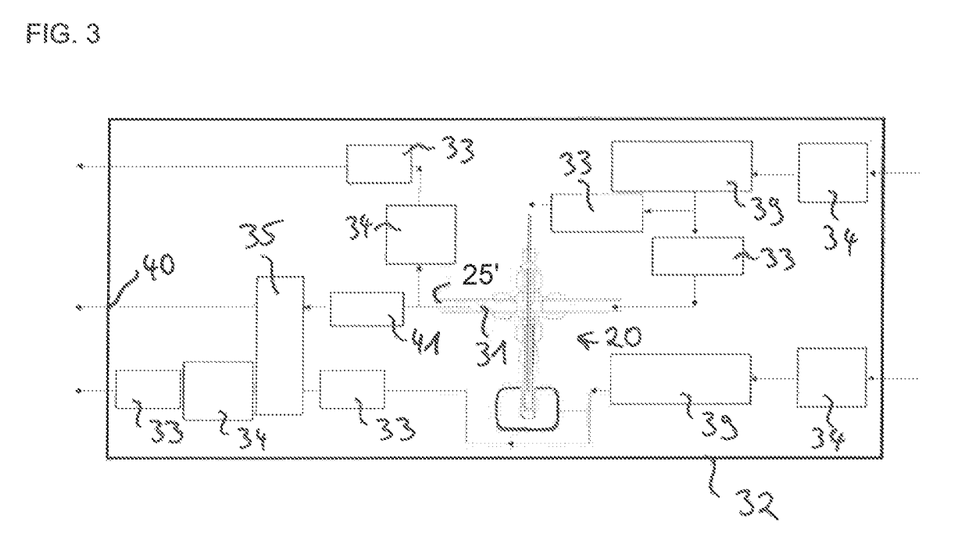
Figure 4:
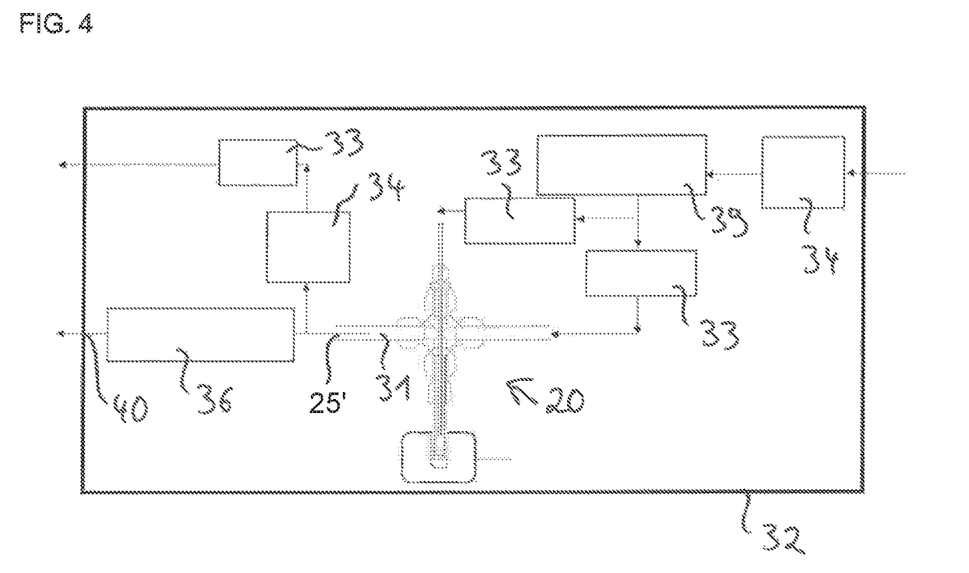
Figure 5:
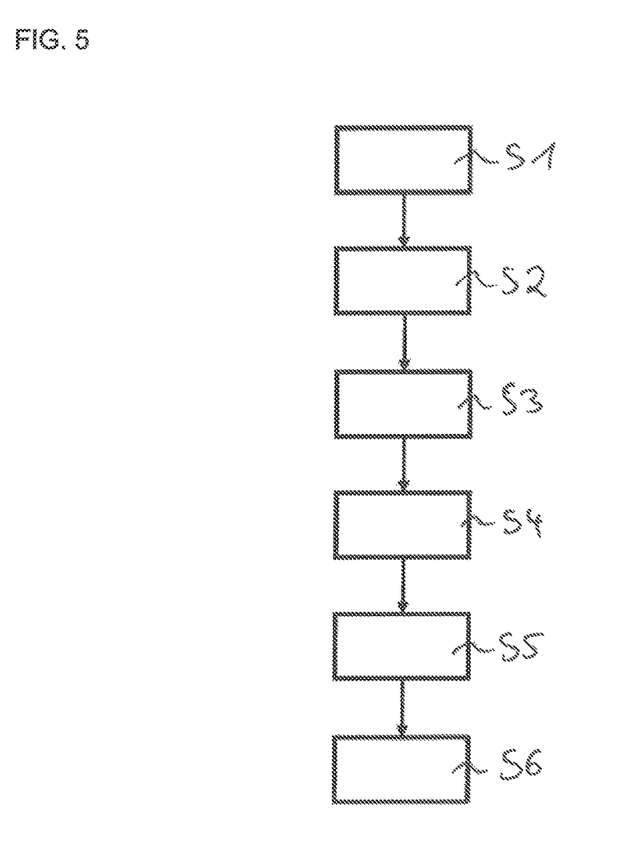

FIG. 2 shows an exemplary embodiment of an arrangement 32 for the production of nanoparticles. The arrangement 32 comprises the apparatus 20. The arrangement 32 further comprises a particle filter 34 that is connected to the surroundings of the arrangement 32. The particle filter 34 is configured in such a way that air from the surroundings of the arrangement 32 is provided to the particle filter 34. The particle filter 34 is configured to filter nanoparticles out of the air provided to the particle filter 34. The particle filter 34 is connected with a blowing device 39. The blowing device 39 is configured to provide the air provided to the blowing device 39 to mass flow controllers 33 that are connected to the blowing device 39. Two mass flow controllers 33 are connected to the blowing device 39. The mass flow controllers 33 are configured to provide a controllable amount of air per time. One of the mass flow controllers 33 is connected to the first opening 24 of the inlet tube 27. The other mass flow controller 33 is connected to the first opening 24' of the outlet tube 31. In this way, controlled amounts of gas can be provided to both the inlet tube 27 and the outlet tube 31.

The second opening 25' of the outlet tube 31 is connected with another particle filter 34 and an outlet 40 of the arrangement 32. At the outlet 40 an aerosol provided at the second opening 25' of the outlet tube 31 can be provided. A part of the aerosol provided at the second opening 25' of the outlet tube 31 is led to the particle filter 34. The particle filter 34 is connected to a mass flow controller 33. The mass flow controller 33 provides the received gas to the surroundings of the arrangement 32. By employing the particle filter 34 that is connected to the second opening 25' of the outlet tube 31 the amount of aerosol provided per time at the outlet 40 can be controlled and adjusted.

FIG. 3 shows a further exemplary embodiment of the arrangement 32. In addition to the embodiment shown in FIG. 2 the arrangement 32 comprises a differential mobility analyzer 35. Furthermore, a charging element 41 is arranged between the second opening 25' of the outlet tube 31 and the differential mobility analyzer 35. The charging element 41 is configured to positively or negatively charge nanoparticles comprised by an aerosol provided at the second opening 25' of the outlet tube 31. In the differential mobility analyzer 35 the charged nanoparticles are analyzed with respect to their charge to drag ratio. The differential mobility analyzer 35 is connected to the outlet 40 and is configured to provide an aerosol with monodisperse nanoparticles to the outlet 40.

The arrangement 32 further comprises another particle filter 34 which is configured to be provided with air from the surroundings of the arrangement 32. The particle filter 34 is connected with another blowing device 39. The blowing device 39 is connected to another mass flow controller 33. The mass flow controller 33 is connected to the differential mobility analyzer 35. In this way, the flow of gas within the differential mobility analyzer 35 can be controlled. The differential mobility analyzer 35 is connected to another particle filter 34 which is connected to another mass flow controller 33. Via the mass flow controller 33 gas that is not required anymore by the differential mobility analyzer 35 is provided to the surroundings of the arrangement 32.

FIG. 4 shows another exemplary embodiment of the arrangement 32. In comparison to the embodiment shown in FIG. 2 the arrangement 32 further comprises a furnace 36. The furnace 36 is connected to the second opening 25' of the outlet tube 31. In the furnace 36 nanoparticles in the aerosol provided at the second opening 25' of the outlet tube 31 can be heated so that they form nanoparticles with a homogenous shape, for example the shape of spheres. The furnace 36 is connected to the outlet 40.

With FIG. 5 an exemplary embodiment of the method for producing nanoparticles is described. The method comprises the following steps that are not necessarily carried out in this order but can be carried out in this order. In a first step Si the main tube 21 is provided. In a second step S2 the main opening 26 is provided in the main tube 21. In a third step S3 a precursor material is positioned at the sample position 30 within the main tube 21. In a fourth step S4 the precursor material is evaporated by heating the precursor material by the heating device 29 that is in thermal contact with the main tube 21. Preferably, the precursor material comprises silver.

In a fifth step S5 a stream of a primary gas is provided into the main tube 21 through the inlet channel 23 that is arranged within the main tube 21. The main direction of extension of the stream of primary gas can enclose an angle of at least 0° and at most 45° with the direction of the gravitational force. As the evaporated precursor material condenses in the primary gas an aerosol comprising nanoparticles is formed. Via the stream of the primary gas provided by the mass flow controller 33, the aerosol is led through the main opening 26 towards the outlet tube 31. In a sixth step S6 a stream of a dilution gas is provided. A primary dilution and/or a secondary dilution are provided to the nanoparticles. This means, the dilution gas is provided at the first opening 24' of the outlet tube 31 for a primary dilution and/or the dilution gas is provided at the second opening 25' of the outlet tube 31 for a secondary dilution. The aerosol and the dilution gas mix such that an aerosol with a desired dilution is provided. Since the cross section of the main tube 21 at the sample position 30 is smaller than at other positions of the main tube 21, the nanoparticles can be formed in a reliable way.

The invention claimed is:

1. An apparatus for producing nanoparticles, the apparatus comprising:
- a main tube, that is closed at a bottom;
- an inlet channel which is arranged within the main tube and comprises a first opening to an outside of the apparatus and a second opening to the main tube; and
- a main opening in the main tube, wherein
  - the main tube comprises a sample position at the bottom,
  - a cross section of the main tube at the sample position is smaller than at other positions of the main tube,
  - the second opening of the inlet channel is arranged closer to the sample position than the main opening, and
  - an outlet tube is connected to the main opening of the main tube, and the outlet tube comprises a first opening and a second opening that fluidly communicate with the outside of the apparatus, wherein the connection of the outlet tube to the main tube is arranged between the first opening and the second opening of the outlet tube.

2. The apparatus according to claim 1, wherein the inlet channel is formed by an inlet tube that is arranged within the main tube and extends further outside of the main tube.

3. The apparatus according to claim 2, wherein the main tube has a circular cross section and the inlet tube is arranged such that a center of its cross section coincides with that of the main tube.

4. The apparatus according to claim 1, wherein an outlet channel extends parallel to the inlet channel within the main tube and the outlet channel is connected with the main opening.

5. The apparatus according to claim 1, wherein the main tube comprises a material that has a melting point of at least 1000° C.

6. The apparatus according to claim 1, wherein a heating device is arranged around the main tube at least in the region of the sample position.

7. The apparatus according to claim 1, wherein a cross section of the outlet tube is larger than the cross section of the inlet channel.

8. An arrangement for producing nanoparticles, comprising the apparatus according to claim 1, and a mass flow controller that is connected to the inlet channel.

9. The arrangement according to claim 8, wherein a particle filter is connected to the second opening of the outlet tube.

10. The arrangement according to claim 8, wherein a differential mobility analyzer is connected to the second opening of the outlet tube.

11. The arrangement according to claim 8, wherein a furnace is connected to the second opening of the outlet tube.

12. The apparatus according to claim 1, wherein the main tube is at least partially mounted within a holder of the apparatus and the sample position is arranged at a variable distance with respect to the holder.

13. The apparatus according to claim 4, wherein the outlet channel has the same length as the inlet channel along a main axis of extension of the main tube.

14. The apparatus according to claim 2, wherein the inlet tube extends through an outlet tube.

15. An apparatus for producing nanoparticles, the apparatus comprising:
- a main tube, that is closed at a bottom;
- an inlet channel which is arranged within the main tube and comprises a first opening to an outside of the apparatus and a second opening to the main tube; and
- a main opening in the main tube, wherein
  - the main tube comprises a sample position at the bottom,
  - a cross section of the main tube at the sample position is smaller than at other positions of the main tube,
  - the second opening of the inlet channel is arranged closer to the sample position than the main opening,
  - an outlet channel extends parallel to the inlet channel within the main tube and the outlet channel is connected with the main opening, and
  - the outlet channel has the same length as the inlet channel along a main axis of extension of the main tube.

16. An apparatus for producing nanoparticles, the apparatus comprising:
- a main tube, that is closed at a bottom;
- an inlet channel which is arranged within the main tube and comprises a first opening to an outside of the apparatus and a second opening to the main tube; and
- a main opening in the main tube, wherein
  - the main tube comprises a sample position at the bottom,
  - a cross section of the main tube at the sample position is smaller than at other positions of the main tube,
  - the second opening of the inlet channel is arranged closer to the sample position than the main opening,
  - the inlet channel is formed by an inlet tube that is arranged within the main tube and extends further outside of the main tube, and
  - the inlet tube extends through an outlet tube.

17. The apparatus according to claim 16, wherein the inlet tube is arranged at a center of the main tube.

* * * * *